C. E. SCHNEIDER.
NON-SKID CHAIN AND TIRE.
APPLICATION FILED APR. 28, 1917.
1,304,813.
Patented May 27, 1919.
2 SHEETS—SHEET 1.
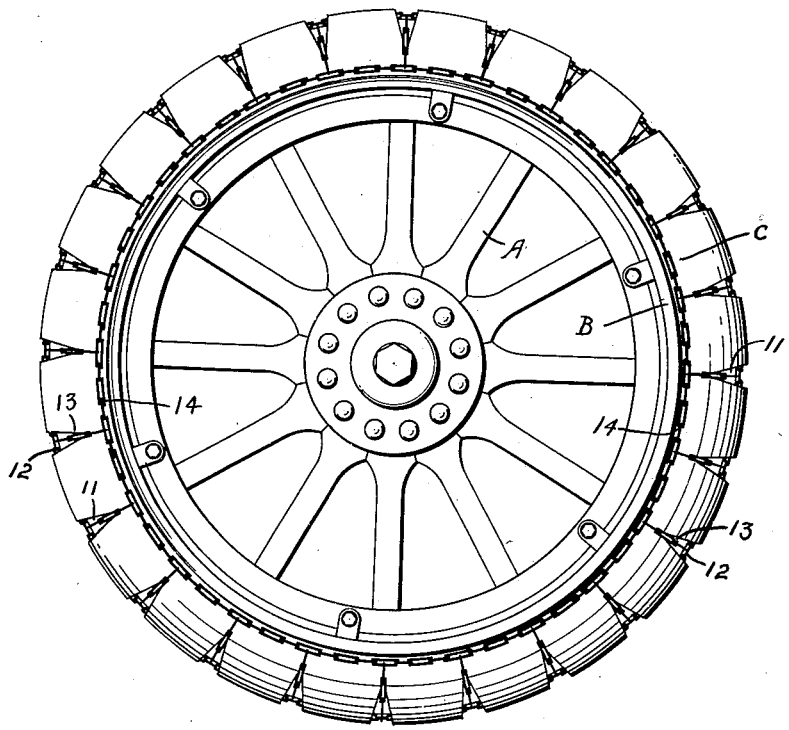
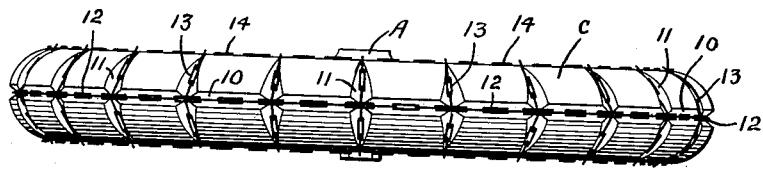
Inventor
C.E. Schneider.

C. E. SCHNEIDER.
NON-SKID CHAIN AND TIRE.
APPLICATION FILED APR. 28, 1917.
1,304,813.
Patented May 27, 1919.
2 SHEETS—SHEET 2.
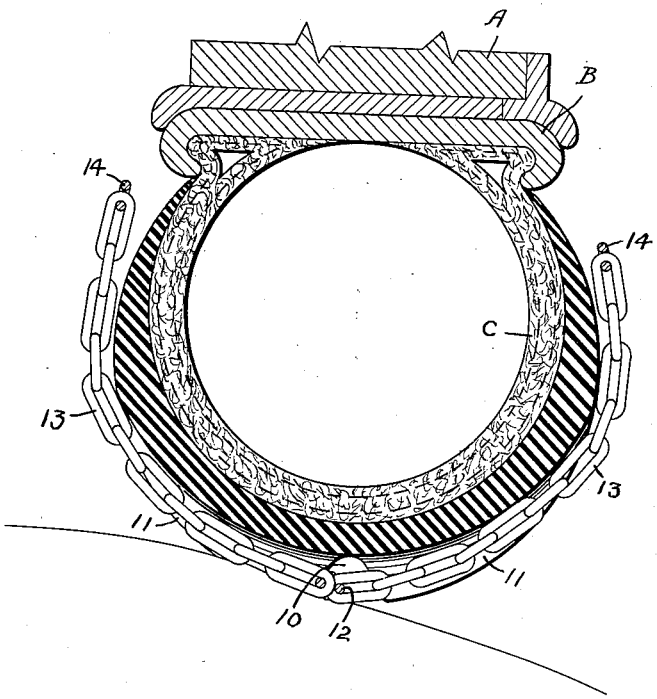
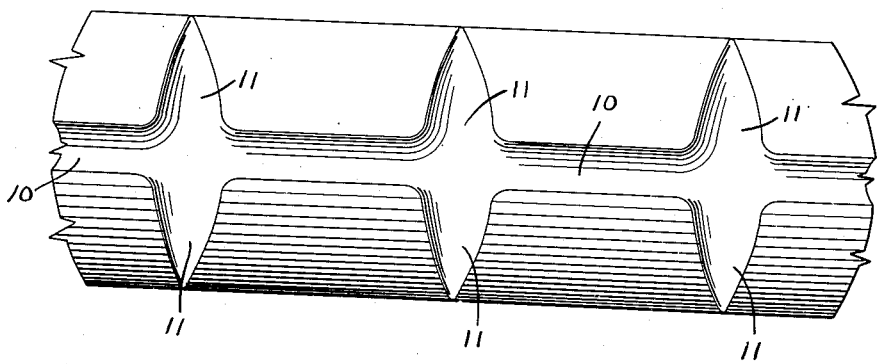
Inventor
C. E. Schneider.

UNITED STATES PATENT OFFICE.

CHARLES E. SCHNEIDER, OF CHICAGO, ILLINOIS.

NON-SKID CHAIN AND TIRE.

1,304,813.           Specification of Letters Patent.      Patented May 27, 1919.

Application filed April 28, 1917. Serial No. 165,250.

*To all whom it may concern:*

Be it known that I, CHARLES E. SCHNEIDER, a citizen of the United States, and a resident of Chicago, in the county of Cook and State of Illinois, have invented a certain new and useful Improvement in Non-Skid Chains and Tires, of which the following is a specification.

The present invention relates to non-skid devices, particularly adapted for application to vehicle wheels, and the like.

An object of the present invention is to provide a combined tire and chain wherein the chain may be normally applied to the tire and held normally out of the way. The invention comprises such peculiar formations of the tread of the tire as to bring the chain into operative relation thereto for engagement with the roadway when there is a tendency for the tire to skid either circumferentially or laterally.

Various other objects and advantages of this invention will be in part described, and in part understood, from the following detailed description of the present preferred embodiment, the same being illustrated in the accompanying drawings, wherein:

Figure 1 is a side elevation of a tire and chain constructed according to the present invention and as applied to a wheel body.

Fig. 2 is a top edge view of the same.

Fig. 3 is a transverse, enlarged section taken through the circumferential portion of the non-skid device, the same being applied to an inclined portion of the roadway, and showing the chain in operative relation with respect to the tire.

Fig. 4 is a fragmentary enlarged outer face view of the tread of the tire with the chain removed.

Referring to these drawings, A designates a wheel body of any suitable construction provided with a rim B, and upon which a tire is mounted which may be the usual pneumatic or solid rubber cushion tire or any approved type of cushion tire used upon vehicle wheels. It is to be understood that when a pneumatic tire is employed, the tire casing or shoe is referred to as a tire in the following description.

The tire designated as C, is provided with a novel tread portion, the same being provided with a circumferential groove 10 which is preferably located centrally of the tread portion thereof and which is intersected at suitably spaced-apart points by a plurality of transversely extending grooves 11. As best shown in Figs. 3 and 4, the grooves 10 and 11 are provided with outwardly flaring or diverging walls or inclined faces, and the grooves 10 and 11 are of considerable depth. The grooves 11 are gradually decreased in depth toward the opposite sides of the tire C and the inner walls of the grooves merge into the outer face of the tire.

The chain which is in applied position at all times on the tire C is in the form of a circumferential portion 12 formed of a plurality of connected links in the usual manner, and which have connected thereto at suitably spaced-apart points the transverse portions 13 which are also formed of connected links or the like in the usual manner. The free ends of the transverse portions 13 of the chain are connected together at opposite sides of the tire C by annular connecting portions 14 adapted to be drawn taut for holding the transverse sections 13 tightly about the tread of the tire.

The circumferential portion 12 of the chain is adapted to fit in the circumferential groove of the tread of the tire, the groove 10 being deeper than the height of the circumferential portion 12 of the chain so that the latter is free to lie loosely therein, and is not urged under pressure against the roadway when the tire is in normal contact therewith. The transverse sections 13 of the chain lie in the transverse grooves 11 of the tread portion, and are normally held from frictional contact with the roadway by virtue of the greater depth of the grooves 11 than the height of the transverse portions 13 of the chain.

As the opposed walls of the grooves 10 and 11 flare or diverge outwardly, as soon as any circumferential or lateral tension is placed upon the tire, or any sections of the chain thereof, the latter is forced against the inclined faces or portions of the grooves of the tread and is thus moved outwardly thereon into frictional contact with the roadway to assist the tire in supporting the wheel against skidding. Thus, when there is a tendency for the tire to skid, the chain is automatically moved into position for frictional contact with the roadway, to thus check the skidding. As shown in Fig. 3, when the tire is supported upon an inclined portion of the roadway, pressure is brought to bear laterally against the tire. The said lateral pressure draws a portion of the chain against the adjacent inclined face of the circumferential grooves 10 and advances the same outwardly into contact with the roadway; the farther the chain is advanced outwardly, the harder it binds against the roadway, and the greater is the force exerted to raise the chain upon the inclined face. Thus, there is a wedging action between the chain and the tire and an effectual gripping of the chain against the roadway is the result.

As the chain is provided with the transverse portions 13 which lie in the relatively deep grooves 11 of the tread, it is impossible for the chain to creep circumferentially about the tire and thus when the chain engages the roadway, and is pinched therebetween and the tire, the chain cannot escape by slipping about the tread.

The same action takes place when there is a tendency for the tire to skid circumferentially. The transverse portions 13 of the chain are drawn against the inclined faces or portions of the tread, and the chain is thus raised out of the grooves of the tread and wedged between the tire and the roadway.

Under normal conditions, the chain lies loosely in the grooves 10 and 11 and has no pressure bearing surface with the roadway. The projecting portions of the tread, which lie between the grooves 10 and 11, engage the roadway and resiliently support the tire. The chain is thus prevented from scraping or injuring the tire, and serves as a reinforcement for preventing injury to the tire when the same is brought into contact with sharp obstacles, such as stones and the like.

It is of course, understood that various changes and modifications may be made in the details of construction of the tire and the chain without departing from the spirit of this invention, being restricted only by the scope of the following claims.

I claim:

1. In a non-skid chain tire, the combination of a tread provided with circumferential and transverse inclined faces, and a chain fitted to said tread adapted to lie between said faces normally out of contact with the roadway, and adapted to be drawn against said faces by the circumferential and lateral skidding of the tire for advancing the chain outwardly into wedging contact with the roadway.

2. In a non-skid chain tire, the combination of a tread having a circumferential groove and transverse grooves intersecting the circumferential groove, and a chain having a circumferential portion and transverse portions connected thereto adapted to lie in said grooves and being of less height than the chain to normally retain the chain from pressure against the roadway, the walls of said grooves diverging outwardly to provide inclined portions adapted to raise the chain in the grooves for contact with the roadway when the chain is drawn laterally and circumferentially.

CHARLES E. SCHNEIDER.